March 18, 1924.
P. A. LEE
DENTAL IMPRESSION TRAY
Filed Aug. 8, 1923
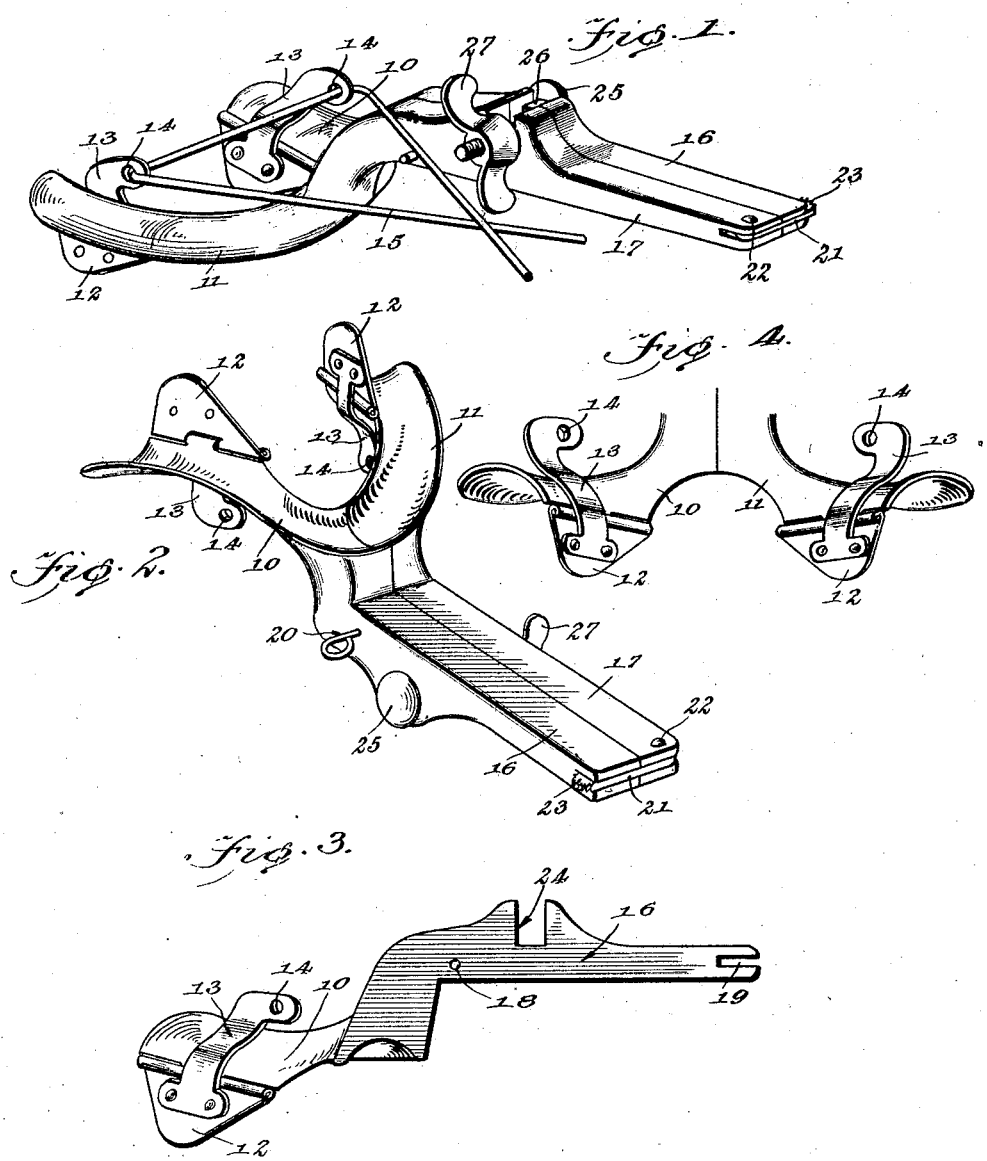

Patented Mar. 18, 1924.

1,487,392

UNITED STATES PATENT OFFICE.

PEYTON ALEXANDER LEE, OF COUSHATTA, LOUISIANA.

DENTAL IMPRESSION TRAY.

Application filed August 8, 1923. Serial No. 656,322.

*To all whom it may concern:*

Be it known that I, PEYTON A. LEE, a citizen of the United States, and a resident of Coushatta, in the parish of Red River and State of Louisiana, have invented certain new and useful Improvements in Dental Impression Trays, of which the following is a specification.

My present invention relates generally to dentures and more particularly to artificial dentures, my object being the provision of a simple, effective and highly useful and convenient device in the nature of an impression tray for taking impressions of the lower jaw.

According to my invention an impression tray is proposed in two parts, so connected that they may be readily detached and the impression broken for convenience in removing the same from the mouth, and then reassembled with every assurance of exact registry in reuniting the parts of the impression in the exact relation that existed between them prior to the breaking thereof.

In the accompanying drawings which illustrate my present invention and form a part of this specification, Figure 1 is a perspective view showing the complete tray with its sections connected in effective relation and looking downwardly upon the top thereof, Figure 2 is a similar view looking at the bottom of the tray, Figure 3 is a side elevation of one of the sections detached, and Figure 4 is a partial front elevation.

Referring now to these figures my present invention proposes an impression tray including a pair of channeled side members or sections 10 and 11, within the channels of which the impression material is supported and held over the dentures of the lower jaw in practice, each of these side members or sections having at the inner side of its outer free end a hinged depending wing 12 provided with an upwardly extending and outwardly curved lever arm 13 which is engageable with the upper surface of the respective side member or section so that in the normal position movement of the two wing plates 12 toward one another will thus be limited while the upstanding lever arms 13 will at the same time form finger engaging levers whereby the wings 12 may be shifted away from one another to force the adjacent portion of the impression material against the gums.

Moreover each of the lever arms 13 has at its upper outer end an opening 14 and in the case of abnormally small mouths a flexible connection such as a cord 15 shown in Figure 1 may be extended through the openings of the two lever arms so that by pulling upon the ends of the cord the same result will be obtained as if the operator had grasped the upper ends of the lever arms and pressed the same toward one another.

At their inner abutting ends the two side members or sections 10 and 11 have upwardly offset laterally abutting shanks 16 and 17, provided adjacent to their inner ends with transversely alined openings 18 and having at their outer ends transversely alined slots 19, the former adapted to receive an alining rod 20 and the latter adapted to receive an alining arm 21 one end of which is pivotally connected as at 22 within the slot 19 of the shank 17. This alining arm 21 has a knurled free end 23 which facilitates the shifting thereof on its pivot 22 into and out of the slot 19 of the shank 16.

The two shanks 16 and 17 when in their effective laterally abutting relation form a handle for the manipulation of the complete tray and for the convenient handling of its two sections and their separation in the mouth after the impression has been taken for the purpose of breaking the impression and permitting quick easy removal of the sections one at a time, in which latter event each shank forms a handle for its own particular section.

The two shanks 16 and 17 are moreover provided with transversely alining grooves 24 for the reception of a clamping screw 25 having a squared portion 26 to interfit the similarly shaped groove 24 of the shank 16 so as to prevent the screw 25 from turning as it is tightened or loosened by manipulation of the clamping wing nut 27.

Thus in practice with the two shanks 16 and 17 connected as shown in Figures 1 and 2 it is obvious that an effective handle is formed in connection with the tray whereby the latter may be easily handled, manipulated and guided in the taking of the impression. After the impression has been taken it is then simply necessary to withdraw the alining rod 20 from the openings 18, swing the alining arm 23 out of the slot 19 of the shank 16 and then loosen the clamping screw and removing the latter, in order that the two sections of the tray may be separated and the impression broken, permitting the two sections to be readily withdrawn independent of one another.

When both sections have been withdrawn it is quite obvious that their reassembly becomes an easy matter by simply placing them together and swinging the alining arm 21 into the slot 19 of the shank 16 and reinserting the alining rod 20, after which the clamping screw may be replaced and tightened with every assurance that the parts are alined exactly as they were previous to removal from the mouth and after completing the impression.

I claim:

1. A dental impression tray including a pair of endwise adjoining side members of channel form having at their adjoining ends offset shanks in laterally abutting relation and forming a handle for the complete tray, each of said shanks forming a handle for its respective side section when detached, and means to connect the shanks to one another including alining elements consisting of slots across the shank ends, and a lug pivoted in one shank and shiftable into and out of said slots whereby the side sections may be detached and reassembled in the same relation existing before their separation.

2. A dental impression tray including a pair of endwise adjoining side members of channel form having at their adjoining ends offset shanks in laterally abutting relation and forming a handle for the complete tray, detachable connections for holding the shanks in engaged relation, the shanks also having alined openings at one side of said connections, and a member extendible through and removable from said openings for insuring alinement of the side members in the connected position.

3. A dental impression tray including a pair of endwise adjoining side sections of channel form, each having a handle member, said handle members abutting in the connected position to form a handle for the manipulation of the complete tray and having transverse grooves, a clamping screw extendible into said grooves, said handle members having apertures adapted for alinement, and connecting members extendible in said apertures to permanently insure alinement of the said side sections in connected position.

PEYTON ALEXANDER LEE.